United States Patent
Qu

(10) Patent No.: US 12,163,784 B1
(45) Date of Patent: Dec. 10, 2024

(54) INTERNAL SOLITARY WAVE (ISW) EARLY WARNING METHOD FOR OFFSHORE PLATFORM BASED ON BAROCLINIC MODE

(71) Applicant: Guangdong Ocean University, Zhanjiang (CN)

(72) Inventor: Ke Qu, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/723,888

(22) PCT Filed: Jan. 18, 2024

(86) PCT No.: PCT/CN2024/073036
§ 371 (c)(1),
(2) Date: Jun. 25, 2024

(87) PCT Pub. No.: WO2024/156265
PCT Pub. Date: Aug. 2, 2024

(30) Foreign Application Priority Data

Jan. 29, 2023 (CN) .......................... 202310064199.3

(51) Int. Cl.
*G01C 13/00* (2006.01)
(52) U.S. Cl.
CPC .................................. *G01C 13/002* (2013.01)
(58) Field of Classification Search
CPC .................................................. G01C 13/002
See application file for complete search history.

(56) References Cited

U.S. PATENT DOCUMENTS

2024/0003862 A1\* 1/2024 Lavely ................... G01C 13/00

FOREIGN PATENT DOCUMENTS

| CN | 102393196 A | | 3/2012 | |
|---|---|---|---|---|
| CN | 103063253 A | | 4/2013 | |
| CN | 108388919 A | \* | 8/2018 | .......... G06K 9/6282 |
| CN | 111964651 A | | 11/2020 | |
| CN | 112099110 A | | 12/2020 | |
| CN | 112113545 A | | 12/2020 | |
| CN | 112683245 A | | 4/2021 | |

(Continued)

*Primary Examiner* — Daniel Pihulic
(74) *Attorney, Agent, or Firm* — Bayramoglu Law Offices LLC

(57) ABSTRACT

An internal solitary wave (ISW) early warning method for an offshore platform based on a baroclinic mode includes the following steps: S1: providing a hydrophone and a bottom-founded transmitting transducer in a sea area of an offshore platform, and acquiring an actually measured sound pressure; S2: solving a hydrodynamic equation to obtain a baroclinic mode of the sea area of the offshore platform; S3: constructing a seawater sound velocity equation according to the baroclinic mode; S4: transforming the seawater sound velocity equation to obtain a relational expression between an amplitude of the baroclinic mode and a seawater sound velocity; S5: solving, according to the actually measured sound pressure, and the relational expression between the amplitude of the baroclinic mode and the seawater sound velocity, the amplitude of the baroclinic mode with a genetic algorithm (GA); and S6: performing monitoring and early warning on an ISW.

9 Claims, 4 Drawing Sheets

(56) References Cited

FOREIGN PATENT DOCUMENTS

| | | | | |
|---|---|---|---|---|
| CN | 113406006 A | | 9/2021 | |
| CN | 115950618 A | * | 4/2023 | |
| CN | 115950618 B | * | 9/2023 | |
| KR | 20150045285 A | | 4/2015 | |
| WO | WO-2024043865 A1 | * | 2/2024 | ............ G01C 13/00 |
| WO | WO-2024156265 A1 | * | 8/2024 | |

* cited by examiner

INTERNAL SOLITARY WAVE (ISW) EARLY WARNING METHOD FOR OFFSHORE PLATFORM BASED ON BAROCLINIC MODE

CROSS-REFERENCE TO THE RELATED APPLICATIONS

This application is the national phase entry of International Application No. PCT/CN2024/073036, filed on Jan. 18, 2024, which is based upon and claims priority to Chinese Patent Application No. 202310064199.3, filed on Jan. 29, 2023, the entire contents of which are incorporated herein by reference.

TECHNICAL FIELD

The present disclosure relates to internal solitary wave (ISW) early warning methods, and in particular to an ISW early warning method for an offshore platform based on a baroclinic mode.

BACKGROUND

As a common ocean dynamic activity, an internal solitary wave (ISW) is ubiquitous in coastal oceans worldwide. Unlike an ocean surface wave, the ISW is mainly manifested in disturbances to a density layer of the sea, an amplitude capable of reaching one hundred meters, high energy, hard attenuation, and long acting time to underwater structures, thus causing great harm to safety of the structures such as offshore platforms. In the technical field of ocean engineering, the ISW is called "an underwater devil." In the South China Sea, the ISW is active on a large scale all the time. In the sea areas near Dongsha Island, operation devices of the offshore platform break down frequently for the ISW to cause dangerous cases. To lower the hazard of the ISW on the offshore platform, it is very essential to perform monitoring and early warning on the ISW in a sea area near the offshore platform.

Presently, there are mainly two methods for monitoring the ISW.

1. A sensor is provided in ISW-passing water for in-situ measurement. Specifically, a temperature sensor, a salinity sensor, an acoustic sensor, and a flow rate sensor are mainly provided to measure water disturbances in the sea area, thereby identifying the ISW. Through this method, the ISW passing through a measuring point can be measured accurately, but only the ISW at the position where the sensor is provided is able to be measured. For extensive coverage, a large number of devices are to be provided, which is time-consuming and not cost-effective. Hence, it is difficult to provide a large-scale early warning service for the sea area near the offshore platform.

2. A synthetic aperture radar (SAR) and an optical remote sensor are used to observe a sea state, and identify the ISW according to a ribbon wave and other characteristics of the sea surface. This method can provide a wide range of observation results for the ISW. However, due to fast attenuation of an optical wave and an electromagnetic wave in the water, the method is only available for offshore observation, and may cause inaccurate inference to the amplitude and other properties of the underwater ISW as well as omission or misjudgment to the ISW with inconspicuous sea surface characteristics. Under interferences from orbits, rainy weathers, clouds and so on, both the SAR and the optical satellite are hard to provide a 24-h continuous real-time early warning service for the offshore platform.

SUMMARY

In view of shortages in the prior art, the present disclosure provides an ISW early warning method for an offshore platform based on a baroclinic mode to solve the following technical problems:

1. The in-situ measurement method by providing a sensor in ISW-passing water has a small monitoring range.

2. The method for observing a sea state with an SAR and an optical remote sensor may cause omission or misjudgment to the ISW with inconspicuous sea surface characteristics, without continuous service time.

To achieve the above objective, the present disclosure adopts the following technical solutions: An ISW early warning method for an offshore platform based on a baroclinic mode includes the following steps:

S1: providing a hydrophone and a bottom-founded transmitting transducer in a sea area of an offshore platform, and acquiring an actually measured sound pressure;

S2: solving a hydrodynamic equation to obtain a baroclinic mode of the sea area of the offshore platform;

S3: constructing a seawater sound velocity equation according to the baroclinic mode;

S4: transforming the seawater sound velocity equation to obtain a relational expression between an amplitude of the baroclinic mode and a seawater sound velocity;

S5: solving, according to the actually measured sound pressure, and the relational expression between the amplitude of the baroclinic mode and the seawater sound velocity, the amplitude of the baroclinic mode with a genetic algorithm (GA) to obtain an amplitude value of the baroclinic mode; and S6: performing monitoring and early warning on an ISW according to the amplitude value of the baroclinic mode.

Further, the hydrodynamic equation in the step S2 is given by:

$$\frac{d^2W}{dz^2} + \frac{N^2W}{\varepsilon^2} = 0$$

where, W is a flow velocity of a water proton, z is a sea depth, E is a phase velocity, and N is a buoyancy frequency.

Further, the step S3 includes the following sub-steps:

S31: constructing a water proton motion equation according to the baroclinic mode of the sea area of the offshore platform;

S32: obtaining a seawater temperature perturbation according to a state equation and the water proton motion equation;

S33: constructing an empirical equation for the seawater sound velocity according to the seawater temperature perturbation and an impact of a seawater salinity on the seawater sound velocity;

S34: calculating a background sound velocity according to the empirical equation for the seawater sound velocity; and S35: constructing the seawater sound velocity equation according to the background sound velocity, the baroclinic mode and the seawater temperature perturbation.

Further, the water proton motion equation in the step S31 is given by:

$$W = \sum_{n=1}^{n=2} b_n \varphi_n$$

where, W is a flow velocity of a water proton, $\varphi_n$ is an nth-order baroclinic mode, and $b_n$ is a weight of the nth-order baroclinic mode;
the state equation in the step S32 is given by:

$$\frac{\partial T}{\partial t} = -W \cdot \frac{\partial T}{\partial z}$$

where, T is the seawater temperature perturbation, t is time, W is the flow velocity of the water proton, z is a sea depth, and ∂ is a partial derivative;
the seawater temperature perturbation in the step S32 is expressed as:

$$T = -\frac{\partial T}{\partial z} \sum_{n=1}^{n=2} b_n \cdot \varphi_n$$

where, T is the seawater temperature perturbation, z is the sea depth, $\varphi_n$ is the nth-order baroclinic mode, and $b_n$ is the weight of the nth-order baroclinic mode; and
the empirical equation for the seawater sound velocity in the step S33 is given by:

$$\frac{dc}{dz} = (4.95 - 0.11T + 0.00087T^2 - 0.1S)\frac{dT}{dz}$$

where, c is the seawater sound velocity, T is the seawater temperature perturbation, S is the seawater salinity, and z is the sea depth.
Further, the seawater sound velocity equation in the step S35 is given by:

$$c = c_0 + \sum_{n=1}^{2} a_n \left(\frac{\partial T}{\partial z} \varphi_n\right)$$

where, c is the seawater sound velocity, $c_0$ is the background sound velocity, T is the seawater temperature perturbation, $\varphi_n$ is an nth-order baroclinic mode, z is the sea depth, and $a_n$ is a coefficient of an nth-order sound velocity based function $$\left(\frac{\partial T}{\partial z} \varphi_n\right).$$

Further, the relational expression between the amplitude of the baroclinic mode and the seawater sound velocity in the step S4 is given by:

$$c = c_0 + \sum_{n=1}^{2} d_n \cdot \varphi_n$$

where, c is the seawater sound velocity, $c_0$ is the background sound velocity, $\varphi_n$ is an nth-order baroclinic mode, and $d_n$ is an amplitude of the nth-order baroclinic mode.
Further, the step S5 includes the following sub-steps:
S51: taking a plurality of amplitudes of the baroclinic mode as individuals in a population, and assigning an initial value to each of the individuals in the population;
S52: substituting a value of the individual into the relational expression between the amplitude of the baroclinic mode and the seawater sound velocity to obtain a sound velocity;
S53: substituting the sound velocity corresponding to the value of the individual into a normal mode model Kraken to obtain two replica-field sound pressures at the bottom-founded transmitting transducer;
S54: obtaining, according to two signals acquired by the hydrophone in real time, two actually measured sound pressures of the hydrophone;
S55: matching the two replica-field sound pressures with the two actually measured sound pressures respectively according to a matched-field processing method to construct a cost function;
S56: calculating a degree of correlation between the replica-field sound pressure and the actually measured sound pressure according to the cost function;
S57: determining whether the degree of correlation is less than a threshold, ending the sub-step if yes, where the value of the present individual is a desired amplitude value of the baroclinic mode; or otherwise, proceeding to a step S58; and
S58: performing crossover and mutation on the individuals in the population to obtain a new value of each of the individuals, and proceeding to the step S52.
Further, the cost function in the step S55 is given by:

$$D = 1 - \frac{|p_1 k_1^* + p_2 k_2^*|^2}{|p_1 p_1^* + p_2 p_2^*|^2 |k_1 k_1^* + k_2 k_2^*|^2}$$

where, D is the degree of correlation, $p_1$ is a first actually measured sound pressure, $p_2$ is a second actually measured sound pressure, $k_1$ is a first replica-field sound pressure matched with the first actually measured sound pressure $p_1$, $k_2$ is a second replica-field sound pressure matched with the second actually measured sound pressure $p_2$, * is a conjugate symbol, and ∥ is a modulus operation.
Further, the step S6 includes the following sub-steps:
S61: respectively seeking a partial derivative of an amplitude value of a first-order baroclinic mode and a partial derivative of an amplitude value of a second-order baroclinic mode over time to obtain a first amplitude changing curve and a second amplitude changing curve; and
S62: determining, when the first amplitude changing curve and the second amplitude changing curve have three discontinuous crosspoints on a horizontal coordinate, that the ISW occurs in a monitoring area of the offshore platform, and performing the early warning, the horizontal coordinate being the time, and a vertical coordinate being the amplitude value of the baroclinic mode.
In conclusion, the present disclosure has the following beneficial effects:

1. By providing the hydrophone and the bottom-founded transmitting transducer in the sea area of the offshore platform, the ISW early warning method for an offshore platform based on a baroclinic mode provided by the present disclosure realizes large-scale and uninterrupted acoustic early warning for the underwater ISW in the surrounding area of the offshore platform, thereby guaranteeing safety of the offshore platform.

2. The present disclosure searches an appropriate value of the baroclinic mode through the actually measured sound pressure, and predicts the ISW through the changing curve for the value of the baroclinic mode. From the most essential physical mechanism of the ISW, the present disclosure can effectively prevent misjudgment and predict the ISW at a high accuracy.

DETAILED DESCRIPTION OF THE EMBODIMENTS

Specific implementations of the present disclosure will be described below so that those skilled in the art can understand the present disclosure, but it should be clear that the present disclosure is not limited to the scope of the specific implementations. For those of ordinary skill in the art, as long as various changes fall within the spirit and scope of the present disclosure defined and determined by the appended claims, these changes are apparent, and all inventions and creations using the concept of the present disclosure are protected.

Figure 1:
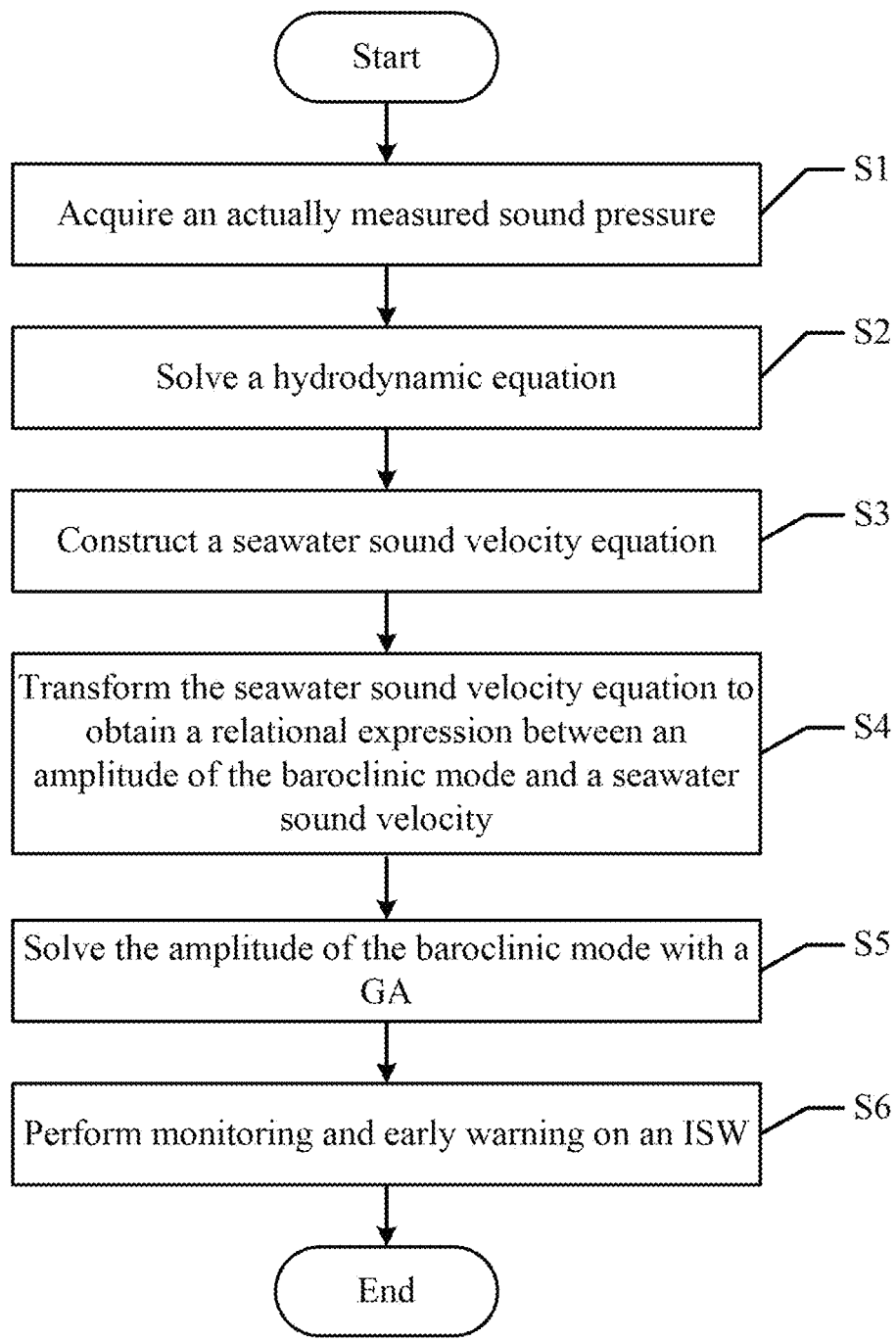
FIG. 1 is a flowchart of an ISW early warning method for an offshore platform based on a baroclinic mode.

As shown in FIG. 1, an ISW early warning method for an offshore platform based on a baroclinic mode includes the following steps:

S1: A hydrophone and a bottom-founded transmitting transducer are provided in a sea area of an offshore platform, and an actually measured sound pressure is acquired.

Figure 2:
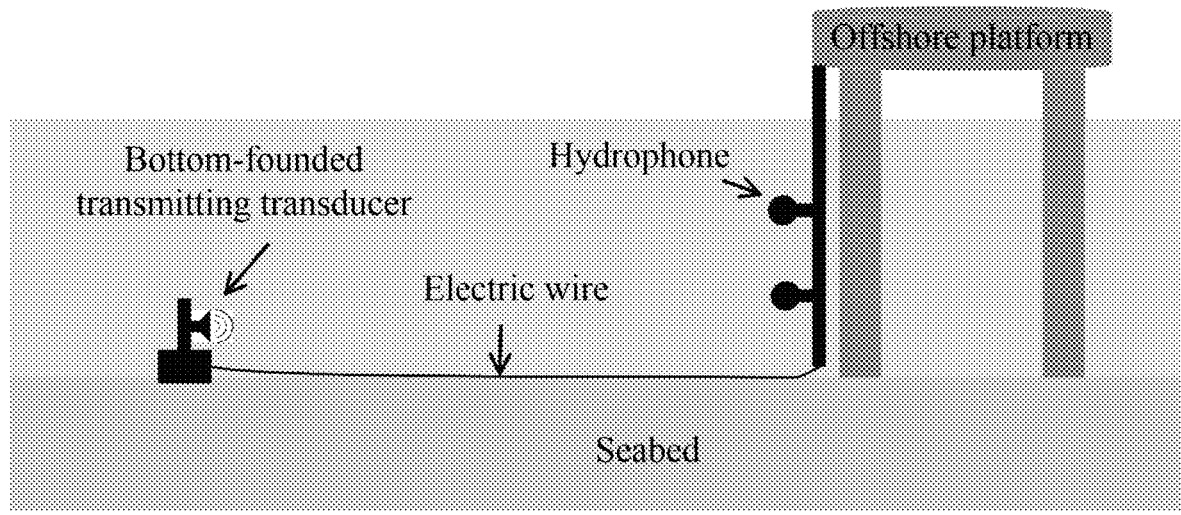
FIG. 2 schematically illustrates an arrangement of a hydrophone and a bottom-founded transmitting transducer.

In the embodiment, as shown in FIG. 2, the hydrophone and the bottom-founded transmitting transducer in the step S1 are provided as follows:

For each to-be-alerted direction of the offshore platform, a pair of hydrophones and the bottom-founded transmitting transducer are provided (in three directions, including two directions parallel to an isobath and a deepening direction of the isobath). The hydrophone and the bottom-founded transmitting transducer are connected through an electric wire on the offshore platform, and powered by the offshore platform.

The bottom-founded transmitting transducer transmits a sound wave at 1 m away from a seabed, A position of the bottom-founded transmitting transducer away from the offshore platform, as well as a sound transmitting frequency and a source level (SL), mainly and comprehensively depends on a sea depth and an early warning range in the area. In view of general conditions of the offshore platform, it is suggested to provide the bottom-founded transmitting transducer at 5 km away from the offshore platform. The bottom-founded transmitting transducer has the SL of 180 dB, and transmits a single-frequency 200-Hz signal every 10 s. It is powered by the electric wire connected to the offshore platform.

The hydrophone may have a type of BK8104 or TC4013. It is fixed at the offshore platform, with a depth being ⅓ and ⅔ of the sea depth.

S2: A hydrodynamic equation is solved to obtain a baroclinic mode of the sea area of the offshore platform.

The hydrodynamic equation in the step S2 is given by:

$$\frac{d^2 W}{dz^2} + \frac{N^2 W}{\varepsilon^2} = 0$$

where, W is a flow velocity of a water proton, z is a sea depth, E is a phase velocity, and N is a buoyancy frequency.

In the embodiment, the hydrodynamic equation is solved with a SEAWATER Library Routines toolbox. By setting a seabed surface as a rigid boundary, the buoyancy frequency is calculated with an average temperature profile and an average salinity profile of the sea area of the platform. A first-order baroclinic mode and a second-order baroclinic mode can be obtained, as the front two baroclinic modes can describe most ocean disturbances. The average temperature profile, the average salinity profile and the sea depth are searched from literatures.

S3: A seawater sound velocity equation is constructed according to the baroclinic mode.

The step S3 includes the following sub-steps:

S31: A water proton motion equation is constructed according to the baroclinic mode of the sea area of the offshore platform.

The water proton motion equation in the step S31 is given by:

$$W = \sum_{n=1}^{n=2} b_n \varphi_n$$

where, W is a flow velocity of a water proton, $\varphi_n$ is an nth-order baroclinic mode, and $b_n$ is a weight of the nth-order baroclinic mode.

S32: A seawater temperature perturbation is obtained according to a state equation and the water proton motion equation.

The state equation in the step S32 is given by:

$$\frac{\partial T}{\partial t} = -W \cdot \frac{\partial T}{\partial z}$$

where, T is the seawater temperature perturbation, t is time, W is the flow velocity of the water proton, z is a sea depth, and ∂ is a partial derivative.

The seawater temperature perturbation in the step S32 is expressed as:

$$T = -\frac{\partial T}{\partial z} \sum_{n=1}^{n=2} b_n \cdot \varphi_n$$

where, T is the seawater temperature perturbation, z is the sea depth, $\varphi_n$ is the nth-order baroclinic mode, and $b_n$ is the weight of the nth-order baroclinic mode.

S33: An empirical equation for the seawater sound velocity is constructed according to the seawater temperature perturbation and an impact of a seawater salinity on the seawater sound velocity.

The empirical equation for the seawater sound velocity in the step S33 is given by:

$$\frac{dc}{dz} = (4.95 - 0.11T + 0.00087T^2 - 0.1S)\frac{dT}{dz}$$

where, c is the seawater sound velocity, T is the seawater temperature perturbation, S is the seawater salinity, and z is the sea depth.

S34: A background sound velocity is calculated according to the empirical equation for the seawater sound velocity.

S35: The seawater sound velocity equation is constructed according to the background sound velocity, the baroclinic mode and the seawater temperature perturbation.

The seawater sound velocity equation in the step S35 is given by:

$$c = c_0 + \sum_{n=1}^{2} a_n \left(\frac{\partial T}{\partial z}\varphi_n\right)$$

where, c is the seawater sound velocity, $c_0$ is the background sound velocity, T is the seawater temperature perturbation, $\varphi_n$ is an nth-order baroclinic mode, z is the sea depth, and an is a coefficient of an nth-order sound velocity based function $$\left(\frac{\partial T}{\partial z}\varphi_n\right).$$

S4: The seawater sound velocity equation is transformed to obtain a relational expression between an amplitude of the baroclinic mode and a seawater sound velocity.

The relational expression between the amplitude of the baroclinic mode and the seawater sound velocity in the step S4 is given by:

$$c = c_0 + \sum_{n=1}^{2} d_n \cdot \varphi_n$$

where, c is the seawater sound velocity, $c_0$ is the background sound velocity, $\varphi_n$ is an nth-order baroclinic mode, and $d_n$ is an amplitude of the nth-order baroclinic mode.

S5: According to the actually measured sound pressure, and the relational expression between the amplitude of the baroclinic mode and the seawater sound velocity, the amplitude of the baroclinic mode is solved with a GA to obtain an amplitude value of the baroclinic mode.

The step S5 includes the following sub-steps:

S51: A plurality of amplitudes of the baroclinic mode are taken as individuals in a population, and an initial value is assigned to each of the individuals in the population.

S52: A value of the individual is substituted into the relational expression between the amplitude of the baroclinic mode and the seawater sound velocity to obtain a sound velocity.

S53: The sound velocity corresponding to the value of the individual is substituted into a normal mode model Kraken to obtain two replica-field sound pressures at the bottom-founded transmitting transducer.

S54: According to two signals acquired by the hydrophone in real time, two actually measured sound pressures of the hydrophone are obtained.

S55: The two replica-field sound pressures are matched with the two actually measured sound pressures respectively according to a matched-field processing method to construct a cost function.

The cost function in the step S55 is given by:

$$D = 1 - \frac{|p_1 k_1^* + p_2 k_2^*|^2}{|p_1 p_1^* + p_2 p_2^*|^2 |k_1 k_1^* + k_2 k_2^*|^2}$$

where, D is the degree of correlation, $p_1$ is a first actually measured sound pressure, $p_2$ is a second actually measured sound pressure, $k_1$ is a first replica-field sound pressure matched with the first actually measured sound pressure $p_1$, $k_2$ is a second replica-field sound pressure matched with the second actually measured sound pressure $p_2$, * is a conjugate symbol, and ‖ is a modulus operation.

S56: A degree of correlation between the replica-field sound pressure and the actually measured sound pressure is calculated according to the cost function.

S57: Whether the degree of correlation is less than a threshold is determined. The sub-step is ended if yes, where the value of the present individual is a desired amplitude value of the baroclinic mode. Or otherwise, a step S58 is proceeded.

S58: Crossover and mutation are performed on the individuals in the population to obtain a new value of each of the individuals, and the step S52 is proceeded.

In the embodiment, the GA involves 64 populations and 100 generations, with a selection probability of 0.5, a crossover probability of 0.8, and a mutation probability of 0.08.

S6: Monitoring and early warning are performed on an ISW according to the amplitude value of the baroclinic mode.

The step S6 includes the following sub-steps:

S61: A partial derivative of an amplitude value of a first-order baroclinic mode and a partial derivative of an amplitude value of a second-order baroclinic mode over time are respectively sought to obtain a first amplitude changing curve and a second amplitude changing curve.

S62: When the first amplitude changing curve and the second amplitude changing curve have three discontinuous crosspoints on a horizontal coordinate, it is determined that the ISW occurs in a monitoring area of the offshore platform, and the early warning is performed, the horizontal coordinate being the time, and a vertical coordinate being the amplitude value of the baroclinic mode.

Figure 3:
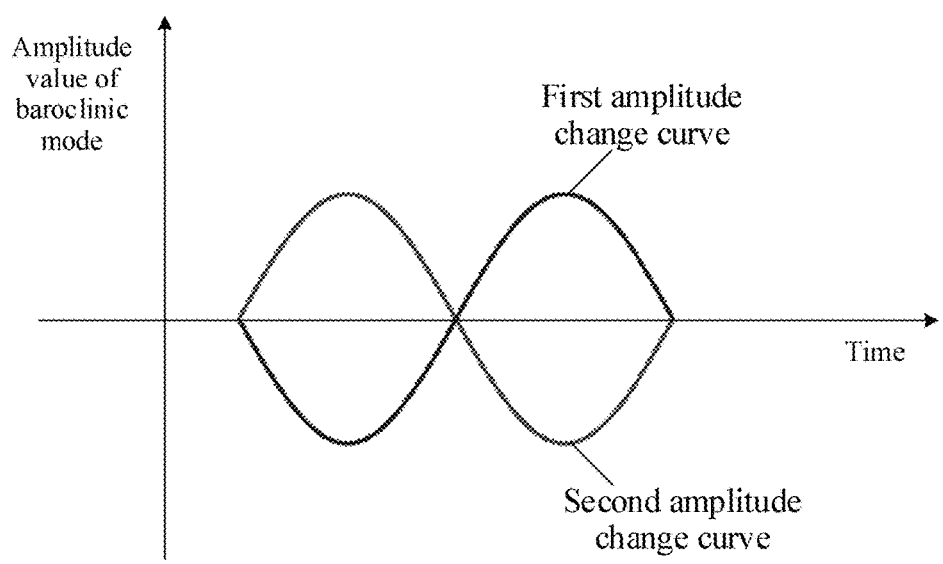
FIG. 3 illustrates a ∞-shaped oscillogram.

A case where the first amplitude changing curve and the second amplitude changing curve have three discontinuous crosspoints on the horizontal coordinate is as shown in FIG. 3. FIG. 3 illustrates a ∞-shaped oscillogram, also called an oscillogram like "an infinitely great mathematical sign".

Further, when the first amplitude changing curve and the second amplitude changing curve in the step S62 satisfy the following four conditions at the same time, the ISW occurs in the monitoring area of the offshore platform. Specifically:
(1) There are the three discontinuous crosspoints, and the two curves form the infinitely great mathematical sign.
(2) The amplitude values on the first amplitude changing curve and the amplitude values on the second amplitude changing curve between the crosspoints have opposite signs.
(3) Amplitude values on two segments of the first amplitude changing curve between the three crosspoints have opposite signs.
(4) Amplitude values on two segments of the second amplitude changing curve between the three crosspoints have opposite signs.

In the embodiment, with analysis on the ∞-shaped oscillogram, the following cases on the ISW can be concluded:
(1) In response to the ∞-shaped oscillogram, it is determined that the ISW occurs in the sea area.
(2) According to the amplitude of the ∞-shaped oscillogram, the amplitude of the ISW can be monitored. The amplitude of the ISW is directly proportional to a maximum value for the amplitude value of the first-order mode over the time change rate $\partial d_1/\partial t$.
(3) According to a duration of the ∞-shaped oscillogram, a wavelength of the ISW can be monitored. The duration of the ISW is time from generation to termination of the ∞-shaped oscillogram.

The present disclosure is based on the following theoretical supports.

Typically, front two baroclinic modes can be taken as a base function to describe water disturbances. For most sea areas, the front two baroclinic modes have a variance contribution rate of 90% or more in description of the water disturbances. This indicates that amplitude changes of the front two baroclinic modes can describe most water changes. In other words, it can be considered that the water disturbances are largely caused by the first-order baroclinic mode and the second-order baroclinic mode.

Figure 4:
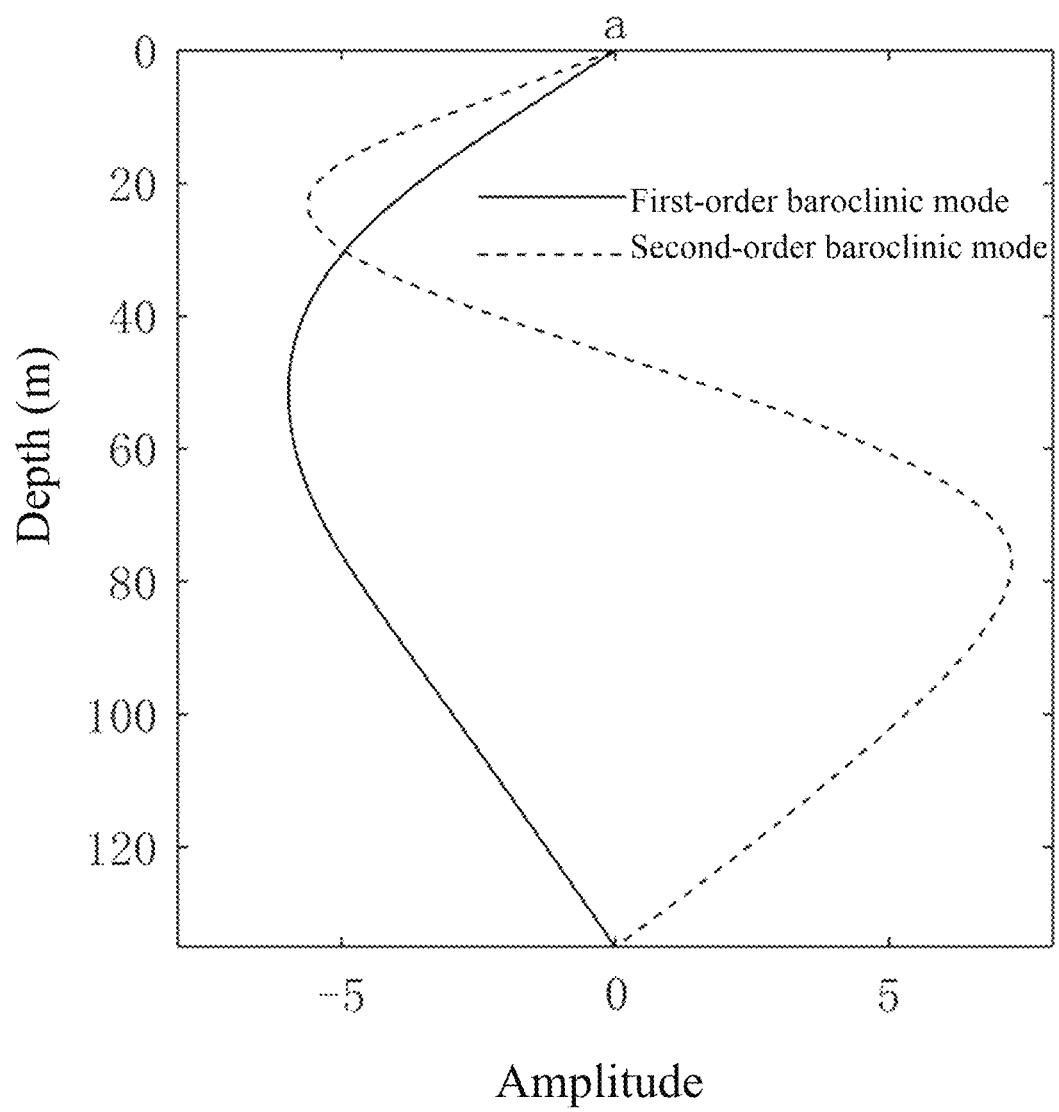
FIG. 4 illustrates typical features of front two modes.

FIG. 4 illustrates typical features of the front two modes. The following rules can be used:
1. In the first-order mode, amplitude values have a same positive or negative sign at each depth, indicating that isodenses of the water move in a same direction. The amplitude values in the first-order mode represent the movements of the isodenses in the same direction.
2. In the second-order mode, amplitude values have different signs with respect to the maximum value of the first-order mode, indicating that isodenses above and below a pycnocline move reversely. The amplitude values in the second-order mode represent a change of a density gradient of the pycnocline.
3. As the front two modes can describe most seawater dynamic disturbances, changes in the amplitude values of the front two modes determine a main moving state of the water.
4. Due to orthogonality of the mode, changes in the amplitude values of the two modes always have opposite signs. Physically, during changes of the water, the water is also prone to restoration to an initial state.

These rules are subsequently used to identify the ISW.

Figure 5:
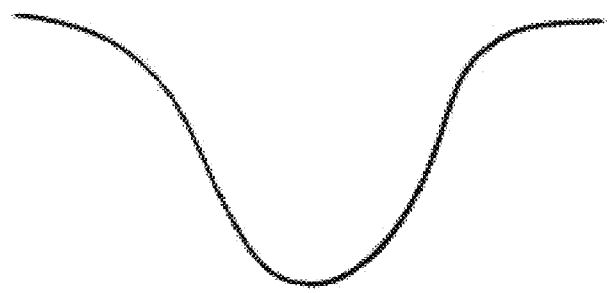
FIG. 5 illustrates a change trend of isodenses when an ISW occurs.

When the ISW occurs, the amplitude values $d_1$ and $d_2$ of the modes and values $\partial d_1/\partial t$ and $\partial d_2/\partial t$ obtained by seeking derivatives of the amplitude values over time t are summarized as follows:

FIG. 5 illustrates a change trend of isodenses of a thermocline when an ISW occurs.

TABLE 1

Amplitude values in a former period from generation to amplitude maximization of the ISW and a change trend of derivatives

| Parameter | Change trend | Corresponding ISW movement mechanism |
| --- | --- | --- |
| First-order amplitude $d_1$ | Increased | Upon generation of the ISW, the isodenses move in a same direction. |
| Second-order amplitude $d_2$ | Increased | Upon generation of the ISW, the isodenses move in a same direction. Since there are different amplitude values at different depths in the first-order mode, a movement velocity above the pycnocline is greater than a movement velocity below the pycnocline, thus causing a larger gradient of the pycnocline. |
| Time change rate $\partial d_1/\partial t$ of the first-order amplitude | Accelerated to increase | Upon generation of the ISW, the isodenses accelerate to move in a same direction. |
| Time change rate $\partial d_2/\partial t$ of the second-order amplitude | Accelerated to increase | Upon generation of the ISW, the isodenses accelerate to move in a same direction, and the corresponding density gradient is also increased. |

TABLE 2

Amplitude values in a later period from generation to amplitude maximization of the ISW and a change trend of derivatives

| Parameter | Change trend | Corresponding ISW movement mechanism |
| --- | --- | --- |
| First-order amplitude $d_1$ | Increased | Upon generation of the ISW, the isodenses move in a same direction. |
| Second-order amplitude $d_2$ | Increased | Upon generation of the ISW, the isodenses move in a same direction. Since there are different amplitude values at different depths |

TABLE 2-continued

Amplitude values in a later period from generation to amplitude maximization of the ISW and a change trend of derivatives

| Parameter | Change trend | Corresponding ISW movement mechanism |
|---|---|---|
|  |  | in the first-order mode, a movement velocity above the pycnocline is greater than a movement velocity below the pycnocline, thus causing a larger gradient of the pycnocline. |
| Time change rate $\partial d_1/\partial t$ of the first-order amplitude | Decelerated to increase | Upon generation of the ISW, the isodenses accelerate to move in a same direction, but the acceleration is lowered constantly compared with the initial acceleration. |
| Time change rate $\partial d_2/\partial t$ of the second-order amplitude | Decelerated to increase | Upon generation of the ISW, the isodenses accelerate to move in a same direction, and the corresponding density gradient is also increased. The corresponding amplitude acceleration is decreased, and the gradient is also decreased. |

TABLE 3

Amplitude values in response to amplitude maximization of the ISW and a change trend of derivatives

| Parameter | Change trend | Corresponding ISW movement mechanism |
|---|---|---|
| First-order amplitude $d_1$ | Up to the maximum value | The isodenses of the ISW has a maximum amplitude. |
| Second-order amplitude $d_2$ | Up to the maximum value | The isodenses of the ISW has a maximum amplitude, with maximum compression and a maximum density gradient. |
| Time change rate $\partial d_1/\partial t$ of the first-order amplitude | Zero | The amplitude is up to the maximum, and the change rate is zero. |
| Time change rate $\partial d_2/\partial t$ of the second-order amplitude | Zero | The gradient is up to the maximum, and the change rate is zero. |

TABLE 4

Amplitude values in a former period from amplitude maximization to termination of the ISW and a change trend of derivatives

| Parameter | Change trend | Corresponding ISW movement mechanism |
|---|---|---|
| First-order amplitude $d_1$ | Decreased | The ISW is gradually restored to an equilibrium state from the maximum amplitude, and the amplitude of the isodenses is decreased. |
| Second-order amplitude $d_2$ | Decreased | The ISW is gradually restored to an equilibrium state from the maximum amplitude, and the density gradient is gradually decreased from the maximum. |
| Time change rate $\partial d_1/\partial t$ of the first-order amplitude | Increased | The ISW has a decreased amplitude and an increased change rate. This period belongs to the former period when the ISW is restored to the equilibrium position, and it can be considered that the acceleration amplitude is decreased. |
| Time change rate $\partial d_2/\partial t$ of the second-order amplitude | Increased | The ISW is gradually restored to an equilibrium state from the maximum amplitude, and the density gradient is gradually decreased from the maximum. It can be considered that the density gradient is accelerated to decrease. |

TABLE 5

Amplitude values in a later period from amplitude maximization to termination of the ISW and a change trend of derivatives

| Parameter | Change trend | Corresponding ISW movement mechanism |
|---|---|---|
| First-order amplitude $d_1$ | Decreased | The ISW is terminated gradually, the isodenses move in a same direction, and the amplitude is decreased. |
| Second-order amplitude $d_2$ | Increased | The ISW is terminated gradually, the isodenses move in a same direction, and the density gradient is gradually restored to an equilibrium state and to zero. |
| Time change rate $\partial d_1/\partial t$ of the first-order amplitude | Decreased | The ISW is terminated gradually and the isodenses move in a same direction. This period belongs to the later period of the restoration to an equilibrium position, and it can be considered that the amplitude is decelerated to decrease. |
| Time change rate $\partial d_2/\partial t$ of the second-order amplitude | Decreased | The ISW is gradually restored to an equilibrium state from the maximum amplitude, and the density gradient is gradually decreased from the maximum. It can be considered that the density gradient is accelerated to decrease. |

TABLE 6

Termination of the ISW with a zero amplitude

| Parameter | Change trend | Corresponding ISW movement mechanism |
|---|---|---|
| First-order amplitude $d_1$ | Up to the maximum value | The isodenses of the ISW has a maximum amplitude. |
| Second-order amplitude $d_2$ | Up to the maximum value | The isodenses of the ISW has a maximum amplitude, with maximum compression and a maximum density gradient. |
| Time change rate $\partial d_1/\partial t$ of the first-order amplitude | Zero | The amplitude is up to the maximum, and the change rate is zero. |
| Time change rate $\partial d_2/\partial t$ of the second-order amplitude | Zero | The gradient is up to the maximum, and the change rate is zero. |

According to a physical movement mechanism of the ISW and in combination with the explanations in the above tables, when the ISW occurs, the first-order mode and the second-order mode form the ∞-shaped oscillogram over the time.

The embodiments of the present disclosure have the following beneficial effects:
1. The present disclosure realizes large-scale and 24-h real-time ISW monitoring, and can perform early warning for the sea area of the offshore platform, thereby reducing a dangerous case arising from the ISW.
2. The present disclosure provides an acoustic ISW monitoring solution, has a relatively simple and economic equipment arrangement, can provide automatic 24-h monitoring, and is less affected by factors such as weathers, communication, and manual operation.
3. The present disclosure realizes ISW early warning with the baroclinic mode, can effectively prevent misjudgment from the most essential physical mechanism of the ISW, and can monitor the amplitude, cycle and the like of the ISW.

Figure 6:
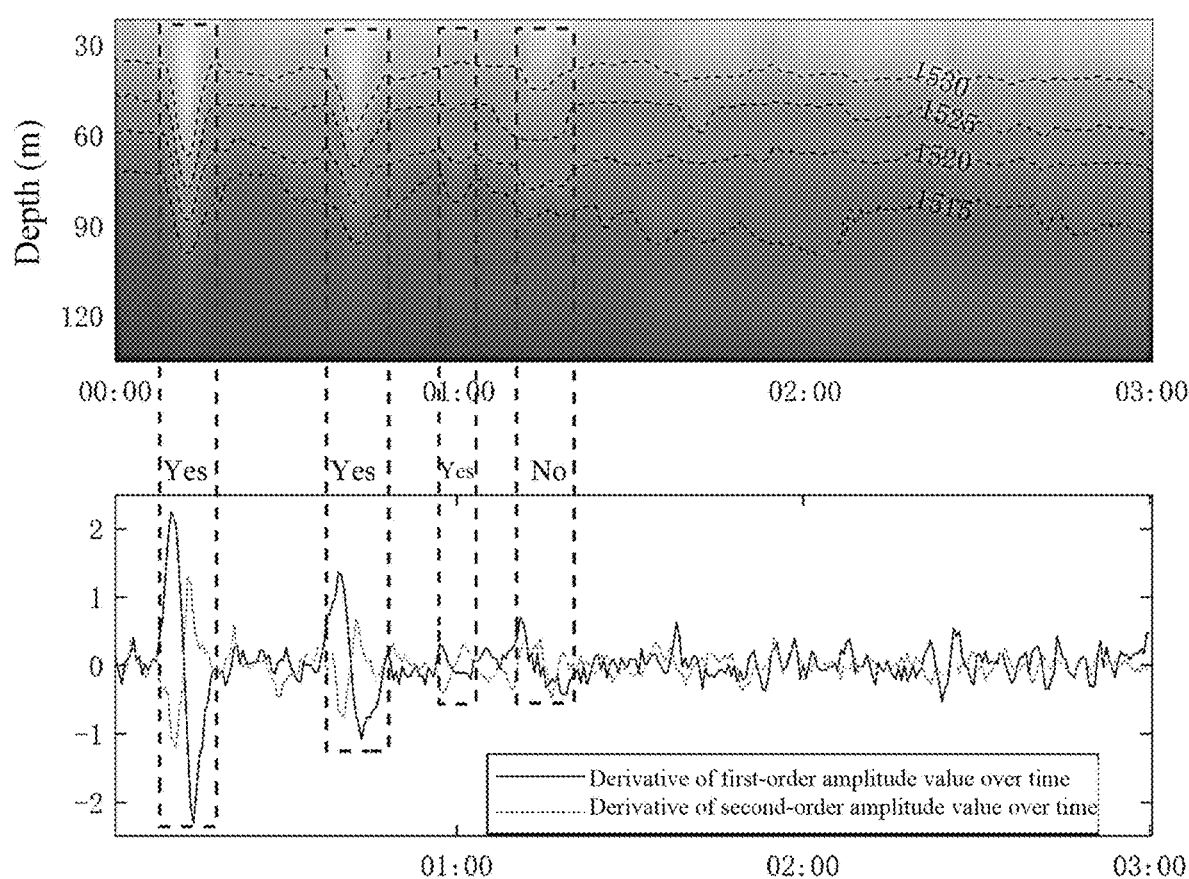
FIG. 6 illustrates an ISW early warning example.

As shown in FIG. 6, the method in the present disclosure is used for ISW early warning. It can be seen that three ISWs are effectively identified. The ∞-shaped oscillogram corresponds to generation and termination of the ISW, with the amplitude directionally proportional to the amplitude of the ISW. The third ISW not obvious to the sea surface can also be effectively identified. For the fourth movement to the sea surface, because of no ∞-shaped oscillogram, there is no ISW, and this judgment is correct from deep ocean observations.

In the three ∞-shaped oscillograms, the maximum value for the first-order amplitude value over the time change rate are strictly directly proportional to the amplitude value of the ISW, and can be used to estimate the amplitude value of the ISW. In the three ∞-shaped oscillograms, the duration is the same as the cycle of the ISW, and can be used to estimate the cycle of the ISW.

What is claimed is:
1. An internal solitary wave (ISW) early warning method for an offshore platform based on a baroclinic mode, comprising the following steps:
   S1: providing a hydrophone and a bottom-founded transmitting transducer in a sea area of an offshore platform, and acquiring an actually measured sound pressure;
   S2: solving a hydrodynamic equation to obtain a baroclinic mode of the sea area of the offshore platform;
   S3: constructing a seawater sound velocity equation according to the baroclinic mode;
   S4: transforming the seawater sound velocity equation to obtain a relational expression between an amplitude of the baroclinic mode and a seawater sound velocity;
   S5: solving, according to the actually measured sound pressure, and the relational expression between the amplitude of the baroclinic mode and the seawater sound velocity, the amplitude of the baroclinic mode with a genetic algorithm (GA) to obtain an amplitude value of the baroclinic mode; and
   S6: performing monitoring and early warning on an ISW according to the amplitude value of the baroclinic mode.
2. The ISW early warning method for the offshore platform based on the baroclinic mode according to claim 1, wherein the hydrodynamic equation in the step S2 is given by:

$$\frac{d^2W}{dz^2} + \frac{N^2W}{\varepsilon^2} = 0$$

wherein, W is a flow velocity of a water proton, z is a sea depth, $\varepsilon$ is a phase velocity, and N is a buoyancy frequency.

3. The ISW early warning method for the offshore platform based on the baroclinic mode according to claim 1, wherein the step S3 comprises the following sub-steps:
   S31: constructing a water proton motion equation according to the baroclinic mode of the sea area of the offshore platform;
   S32: obtaining a seawater temperature perturbation according to a state equation and the water proton motion equation;
   S33: constructing an empirical equation for the seawater sound velocity according to the seawater temperature perturbation and an impact of a seawater salinity on the seawater sound velocity;
   S34: calculating a background sound velocity according to the empirical equation for the seawater sound velocity; and
   S35: constructing the seawater sound velocity equation according to the background sound velocity, the baroclinic mode and the seawater temperature perturbation.

4. The ISW early warning method for the offshore platform based on the baroclinic mode according to claim 3, wherein the water proton motion equation in the step S31 is given by:

$$W = \sum_{n=1}^{n=2} b_n \varphi_n$$

wherein, W is a flow velocity of a water proton, $\varphi_n$ is an nth-order baroclinic mode, and $b_n$ is a weight of the nth-order baroclinic mode;
the state equation in the step S32 is given by:

$$\frac{\partial T}{\partial t} = -W \cdot \frac{\partial T}{\partial z}$$

wherein, T is the seawater temperature perturbation, t is time, W is the flow velocity of the water proton, z is a sea depth, and $\partial$ is a partial derivative;
the seawater temperature perturbation in the step S32 is expressed as:

$$T = -\frac{\partial T}{\partial z} \sum_{n=1}^{n=2} b_n \cdot \varphi_n$$

wherein, T is the seawater temperature perturbation, z is the sea depth, $\varphi_n$ is the nth-order baroclinic mode, and $b_n$ is the weight of the nth-order baroclinic mode; and
the empirical equation for the seawater sound velocity in the step S33 is given by:

$$\frac{dc}{dz} = (4.95 - 0.11T + 0.00087T^2 - 0.1S)\frac{dT}{dz}$$

wherein, c is the seawater sound velocity, T is the seawater temperature perturbation, S is the seawater salinity, and z is the sea depth.

5. The ISW early warning method for the offshore platform based on the baroclinic mode according to claim 3, wherein the seawater sound velocity equation in the step S35 is given by:

$$c = c_0 + \sum_{n=1}^{2} a_n \left(\frac{\partial T}{\partial z}\varphi_n\right)$$

wherein, c is the seawater sound velocity, $c_0$ is the background sound velocity, T is the seawater temperature perturbation, $\varphi_n$ is an nth-order baroclinic mode, z is a sea depth, and $a_n$ is a coefficient of an nth-order sound velocity based function $$\left(\frac{\partial T}{\partial z}\varphi_n\right).$$

6. The ISW early warning method for the offshore platform based on the baroclinic mode according to claim 1, wherein the relational expression between the amplitude of the baroclinic mode and the seawater sound velocity in the step S4 is given by:

$$c = c_0 + \sum_{n=1}^{2} d_n \cdot \varphi_n$$

wherein, c is the seawater sound velocity, $c_0$ is a background sound velocity, $\varphi_n$ is an nth-order baroclinic mode, and $d_n$ is an amplitude of the nth-order baroclinic mode.

7. The ISW early warning method for the offshore platform based on the baroclinic mode according to claim 1, wherein the step S5 comprises the following sub-steps:
   S51: taking a plurality of amplitudes of the baroclinic mode as individuals in a population, and assigning an initial value to each of the individuals in the population;
   S52: substituting the value of the individual into the relational expression between the amplitude of the baroclinic mode and the seawater sound velocity to obtain a sound velocity;
   S53: substituting the sound velocity corresponding to the value of the individual into a normal mode model Kraken to obtain two replica-field sound pressures at the bottom-founded transmitting transducer;
   S54: obtaining, according to two signals acquired by the hydrophone in real time, two actually measured sound pressures of the hydrophone;
   S55: matching the two replica-field sound pressures with the two actually measured sound pressures respectively according to a matched-field processing method to construct a cost function;
   S56: calculating a degree of correlation between the replica-field sound pressure and the actually measured sound pressure according to the cost function;
   S57: determining whether the degree of correlation is less than a threshold, ending the sub-step if yes, wherein the value of the present individual is a desired amplitude value of the baroclinic mode; or otherwise, proceeding to a step S58; and S58: performing crossover and mutation on the individuals in the population to obtain a new value of each of the individuals, and proceeding to the step S52.

8. The ISW early warning method for the offshore platform based on the baroclinic mode according to claim 7, wherein the cost function in the step S55 is given by:

$$D = 1 - \frac{|p_1 k_1^* + p_2 k_2^*|^2}{|p_1 p_1^* + p_2 p_2^*|^2 |k_1 k_1^* + k_2 k_2^*|^2}$$

wherein, D is the degree of correlation, $p_1$ is a first actually measured sound pressure, $p_2$ is a second actually measured sound pressure, $k_1$ is a first replica-field sound pressure matched with the first actually measured sound pressure $p_1$, $k_2$ is a second replica-field sound pressure matched with the second actually measured sound pressure $p_2$, * is a conjugate symbol, and $\|$ is a modulus operation.

9. The ISW early warning method for the offshore platform based on the baroclinic mode according to claim 1, wherein the step S6 comprises the following sub-steps:

S61: respectively seeking a partial derivative of an amplitude value of a first-order baroclinic mode and a partial derivative of an amplitude value of a second-order baroclinic mode over time to obtain a first amplitude changing curve and a second amplitude changing curve; and S62: determining, when the first amplitude changing curve and the second amplitude changing curve have three discontinuous crosspoints on a horizontal coordinate, that the ISW occurs in a monitoring area of the offshore platform, and performing the early warning, the horizontal coordinate being the time, and a vertical coordinate being the amplitude value of the baroclinic mode.

\* \* \* \* \*